(12) United States Patent
Hoffmann et al.

(10) Patent No.: US 8,959,884 B2
(45) Date of Patent: Feb. 24, 2015

(54) POWER PLANT WITH $CO_2$ CAPTURE AND COMPRESSION

(75) Inventors: Jürgen Hoffmann, Untersiggenthal (CH); Holger Nagel, Stuttgart (DE); Hongtao Li, Aarau (CH)

(73) Assignee: Alstom Technology Ltd., Baden (CH)

( * ) Notice: Subject to any disclaimer, the term of this patent is extended or adjusted under 35 U.S.C. 154(b) by 214 days.

(21) Appl. No.: 13/155,079

(22) Filed: Jun. 7, 2011

(65) Prior Publication Data

US 2011/0304155 A1    Dec. 15, 2011

(30) Foreign Application Priority Data

Jun. 10, 2010    (EP) .................................... 10165506

(51) Int. Cl.
*F01K 23/00*    (2006.01)
*F01K 23/10*    (2006.01)
(52) U.S. Cl.
CPC ............... *F01K 23/10* (2013.01); *Y02E 20/185* (2013.01); *Y02E 20/14* (2013.01); *Y02E 20/16* (2013.01); *Y02E 20/18* (2013.01)
USPC .......................................... 60/39.01; 290/1 R
(58) Field of Classification Search
CPC ....................................................... F01K 23/06
USPC .................................................... 290/1 R
See application file for complete search history.

(56) References Cited

U.S. PATENT DOCUMENTS

| | | | | |
|---|---|---|---|---|
| 3,243,621 A | * | 3/1966 | Wesolowski ................... | 310/168 |
| 3,284,651 A | * | 11/1966 | Wesolowski ................... | 310/168 |
| 3,733,095 A | * | 5/1973 | Sinclair et al. .................. | 290/52 |
| 3,943,374 A | * | 3/1976 | Clements ......................... | 290/52 |
| 4,158,145 A | * | 6/1979 | Kartsounes et al. ............ | 290/52 |

(Continued)

FOREIGN PATENT DOCUMENTS

| CN | 1656304 A | 8/2005 |
|---|---|---|
| CN | 101218426 A | 7/2008 |

(Continued)

OTHER PUBLICATIONS

Office Action issued on Jun. 30, 2014, by the Chinese Patent Office in corresponding Chinese Patent Application No. 201110172955.1, and an English Translation of the Office Action. (21 pages).

*Primary Examiner* — Joseph Waks
(74) *Attorney, Agent, or Firm* — Buchanan Ingersoll & Rooney PC

(57) ABSTRACT

$CO_2$ compression is a main step in carbon capture and storage, which is essential to control global warming. $CO_2$ compressors are powered by electric motors, which increase operational flexibility but require much energy leading to additional expenses, power and efficiency losses. A method is provided for optimized operation of a plant including a power generation unit with a $CO_2$ capture system and compressor with minimum losses during normal operation, allowing flexible part load. The method allows steam from the power unit to drive a steam turbine, which drives the $CO_2$ compressor via an engaged overrunning clutch if a sufficient amount of steam is available from the power unit, and to drive it by the generator, which is used as motor when insufficient steam is available from the power unit. When no or insufficient steam is available the clutch is disengaged and the steam turbine may be at standstill or idling.

14 Claims, 5 Drawing Sheets

(56) References Cited

U.S. PATENT DOCUMENTS

| | | | |
|---|---|---|---|
| 4,253,031 A * | 2/1981 | Frister | 290/52 |
| 4,347,706 A * | 9/1982 | Drost | 60/659 |
| 4,434,613 A | 3/1984 | Stahl | |
| 4,498,289 A * | 2/1985 | Osgerby | 60/39.52 |
| 4,528,811 A * | 7/1985 | Stahl | 60/784 |
| 4,642,031 A * | 2/1987 | Farr | 417/223 |
| 4,942,734 A * | 7/1990 | Markbreiter et al. | 60/783 |
| 5,175,995 A * | 1/1993 | Pak et al. | 60/39.182 |
| 5,242,278 A * | 9/1993 | Vanderslice et al. | 417/364 |
| 5,247,791 A * | 9/1993 | Pak et al. | 60/39.182 |
| 5,448,889 A * | 9/1995 | Bronicki | 60/641.14 |
| 5,680,764 A * | 10/1997 | Viteri | 60/716 |
| 5,709,077 A * | 1/1998 | Beichel | 60/39.55 |
| 5,715,673 A * | 2/1998 | Beichel | 60/784 |
| 6,170,264 B1 * | 1/2001 | Viteri et al. | 60/671 |
| 6,389,814 B2 * | 5/2002 | Viteri et al. | 60/716 |
| 6,598,398 B2 * | 7/2003 | Viteri et al. | 60/716 |
| 7,043,920 B2 * | 5/2006 | Viteri et al. | 60/716 |
| 7,781,925 B2 | 8/2010 | Lacaze | |
| 8,324,746 B2 * | 12/2012 | Bradbrook | 290/1 A |
| 8,461,710 B1 * | 6/2013 | Brostmeyer | 290/52 |
| 2004/0003592 A1 | 1/2004 | Viteri et al. | |
| 2005/0204723 A1 | 9/2005 | Ouwerkerk | |
| 2011/0169278 A1 | 7/2011 | Beul et al. | |
| 2011/0265477 A1 * | 11/2011 | Drouvot et al. | 60/653 |
| 2011/0302922 A1 * | 12/2011 | Li et al. | 60/645 |
| 2011/0304155 A1 * | 12/2011 | Hoffmann et al. | 290/1 R |
| 2013/0104563 A1 * | 5/2013 | Oelfke et al. | 60/773 |

FOREIGN PATENT DOCUMENTS

| | | |
|---|---|---|
| EP | 1973222 A1 | 9/2008 |
| EP | 2 136 035 A1 | 12/2009 |

* cited by examiner

US 8,959,884 B2

POWER PLANT WITH CO₂ CAPTURE AND COMPRESSION

FIELD OF INVENTION

The invention relates to a method for operating a power plant with $CO_2$ capture and compression as well as to a plant to carry out such a method

BACKGROUND $CO_2$ (carbon dioxide) has been identified as a main greenhouse gas, CCS (carbon capture and storage) is considered as one of the potential major means to reduce the release of greenhouse gases into the atmosphere and to control global warming. In this context CCS is defined as the process of $CO_2$ capture, compression, transport and storage. Capture is defined as a process in which $CO_2$ is removed either from the flue gases after combustion of a carbon based fuel or the removal of and processing of carbon before combustion. Regeneration of any absorbents, adsorbents or other means to remove $CO_2$ from a flue gas or fuel gas flow is considered to be part of the capture process.

Backend $CO_2$ capture or post combustion capture is a commercially promising technology for fossil fuelled power plants including CCPP (combined cycle power plants). In backend capture the $CO_2$ is removed from a flue gas. The remaining flue gas is released to the atmosphere and the $CO_2$ is compressed for transportation, and storage. There are several technologies known to remove $CO_2$ from a flue gas such as absorption, adsorption, membrane separation, and cryogenic separation.

Besides the energy required to remove the $CO_2$ from flue gases, the energy required for $CO_2$ compression is significant. To minimize the performance penalties due to $CO_2$ compression the use of steam turbines to drive the $CO_2$ compressors has been suggested. However, they rely on the availability of sufficient amounts of live steam. This steam is not available during the start-up and/or part load operation of a power plant. Depending on the type of power plant, it takes considerable time until steam is available. For a more flexible $CO_2$ compressor operation the $CO_2$ compressors are therefore typically powered by electric motors. These increase the operational flexibility but lead to additional expenses, losses in power and efficiency for generators and motors.

SUMMARY

The present disclosure is directed to a power plant including a power unit with a $CO_2$ capture system and a $CO_2$ compressor, and a steam turbine engageably connected to a generator via an overrunning clutch. The generator is connectable to a power grid to deliver power to the grid and operable as a motor. Further, the generator is mechanically connected to the $CO_2$ compressor.

In another aspect, the present disclosure is directed to a method for operating a power plant including a carbon dioxide capture system, a generator, a steam turbine and a $CO_2$ compressor. The method includes operating the generator, for $CO_2$ compression, as a motor to drive the $CO_2$ compressor when insufficient steam to drive the steam turbine is available; and driving the $CO_2$ compressor, by the steam turbine, via an overrunning clutch, which engages when sufficient steam is available.

BRIEF DESCRIPTION OF THE DRAWINGS

The invention, its nature as well as its advantages, shall be described in more detail below with the aid of the accompanying drawings. Referring to the drawings.

DETAILED DESCRIPTION OF THE PREFERRED EMBODIMENTS

Introduction to the Embodiments

Figure 1:
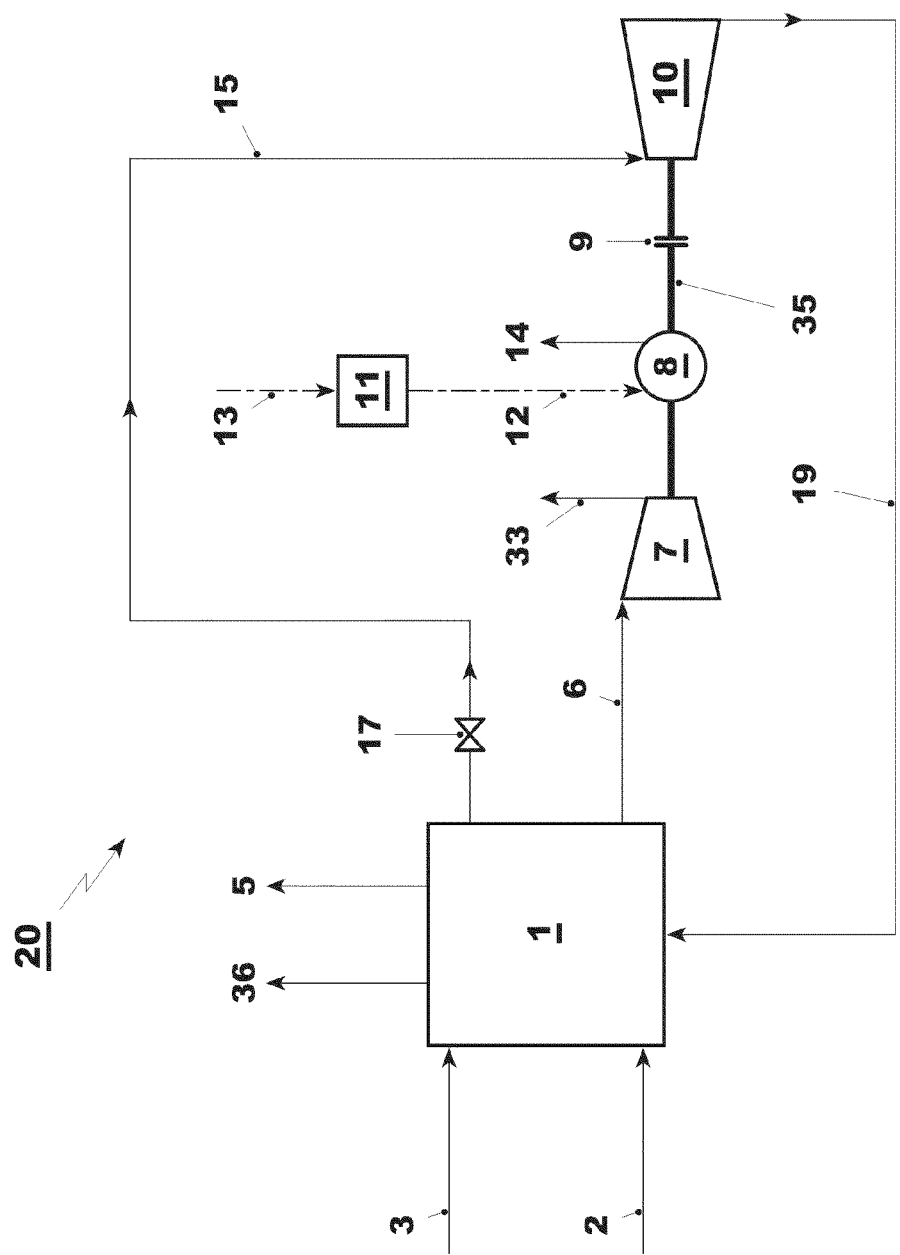
FIG. 1 schematically shows a power plant with a $CO_2$ capture system, a $CO_2$ compressor, a generator and a steam turbine to drive the $CO_2$ compressor, FIG. 2 schematically shows a combined cycle power plant with a $CO_2$ capture system, a $CO_2$ compressor, a generator and a steam turbine to drive the $CO_2$ compressor, FIG. 3 schematically shows a combined cycle power plant with a $CO_2$ capture system, a $CO_2$ compressor, a generator and a back pressure steam turbine to drive the $CO_2$ compressor, FIG. 4 schematically shows a power plant with a plurality of power units including $CO_2$ capture systems, a plurality of $CO_2$ compressors, each arranged on one shafting with a generator and a steam turbine to drive the $CO_2$ compressor, FIG. 5 schematically shows a combined cycle power plant with a $CO_2$ capture system, and a $CO_2$ compressor, in which the $CO_2$ compressor is driven by a steam turbine and/or the generator of the combined cycle.

The main objective of the present invention is to provide a method for the optimized operation of a power plant comprising a power generation unit with a carbon dioxide ($CO_2$) capture system, and a $CO_2$ compressor with minimum losses during normal operation at design point, and which allows flexible part load operation of the $CO_2$ capture system and compressor. By achieving this objective the impact of $CO_2$ compression on the COE (cost of electricity) can be reduced, which will be favorable for the early introduction of CCS into commercial power plants.

In this context a power generating unit or power unit comprises a fossil fired power plant as for example a gas turbine, a combined cycle or a coal-fired boiler with a water steam cycle driving, and $CO_2$ capture equipment.

The invention provides a flexible operating method, which allows the use of steam from the power unit to drive a steam turbine, which drives the $CO_2$ compressor via an engaged overrunning clutch if a sufficient amount of steam is available from the power unit, and to drive the $CO_2$ compressor by the generator, which is used as motor when insufficient steam is available from the power unit. At times when no or insufficient steam is available the overrunning clutch is disengaged and the steam turbine may be at standstill or idling.

To be able to realize such a flexible operation of the $CO_2$ compressors and at the same time avoid the power and efficiency losses due to the electric power generation for driving a motor and to avoid the motor losses, an arrangement of the $CO_2$ compressor with a generator and a steam turbine on one shaft is proposed.

In this arrangement the steam turbine can be disconnected from the generator by an overrunning clutch (also known as freewheel clutch or SSS clutch) when no steam is available. The $CO_2$ compressor is then driven by the generator, which can be operated as a motor for example with the use of a SFC (static frequency converter).

With a SFC or other frequency converters the generator can be operated with variable speed to improve the $CO_2$ compressor part load operation efficiency. Variable speed operation is possible if the $CO_2$ compressor is driven at low speed with the generator alone and at higher speed if driven by the steam turbine or both the steam turbine and generator in combination.

Typically, during normal steady state high part load and/or base load operation of the plant, the steam turbine is engaged via the overrunning clutch and the $CO_2$ compressor is only driven by the steam turbine.

The steam turbine is for example sized to drive the generator and the $CO_2$ compressor. Accordingly, the power plant is typically operated such that surplus power of the steam turbine, which is exceeding the power required to drive the $CO_2$ compressor, is converted into electric power by the generator and feed into the electric grid. In one embodiment the steam turbine is sized such that at design conditions the power of the steam turbine is equal the generator capacity plus the $CO_2$ power requirements.

In a further embodiment, the power plant is operated such that during low part load operation and/or loading the steam turbine is not engaged via the overrunning clutch and in that the $CO_2$ compressor is driven by the generator, which is operated as motor during this operating mode. Low part load is typically a load of less than 30% of the plant base load but depending on the design of the power plant low part load operation can go up to 50% of the plant base load. The use of the generator as a motor to drive the $CO_2$ compressor is also advantageous if no steam is available due to phased construction of a combined cycle power plant or due to an outage of the steam part of a combined cycle power plant, in which the gas turbine is operated in single cycle.

Further, an operation of the power plant is provided, in which the steam turbine is engaged to the generator and $CO_2$ compressor via the overrunning clutch and both the steam turbine and the generator drive the $CO_2$ compressor. This operation method is suitable for load conditions, in which steam is available to drive the steam turbine but the power output of the steam turbine is smaller than the power required to drive the $CO_2$ compressor.

Yet, in another embodiment of the invention the power plant comprises a plurality of power generating units from which the captured $CO_2$ is collected by at least one $CO_2$ manifold. The $CO_2$ collected by this manifold is compressed by a plurality of $CO_2$ compressors. Collecting the $CO_2$ in a manifold and compressing it in a plurality of $CO_2$ compressors improves the flexibility of the $CO_2$ compression and can improve the efficiency of $CO_2$ compression at part load. The amount of $CO_2$ captured form one power unit is proportional to the power output. If one $CO_2$ compressor is used to compress the $CO_2$ from one power unit the compressor has to be deloaded proportional to the reduction in $CO_2$ flow. However, the efficiency of a $CO_2$ compressor decreases with reduced flow rate and deteriorates at flow rates below about 70% design flow and dramatically goes down for flow rates below about 50% design flow. Collection of the $CO_2$ in a manifold and compression by a plurality of $CO_2$ compressors allows operating the $CO_2$ compressors closer to the design point.

For example a power plant with four power units and four $CO_2$ compressors, which is operating at 70% produces between 70% and 75% of the base load $CO_2$. Operation of the $CO_2$ compressors at about 70% would lead to a significant efficiency penalty. The proposed manifold and operating concept allows to shut down one $CO_2$ compressor and compress the total $CO_2$ flow with the remaining three operational $CO_2$ compressors, which in this case operate close to their design point and corresponding with high efficiency.

Further, for example, if the operator decides, for performance or life time reasons to run one the power units at a different load levels, the $CO_2$ compressor dedicated to the unit, which is running at the lowest load level will operate with the lowest $CO_2$ mass flow and correspondingly low efficiency. The overall efficiency for $CO_2$ compression can be increased by evenly distributing the $CO_2$ mass flow to all operating $CO_2$ compressors.

To further increase flexibility of the $CO_2$ compression and to improve its efficiency at part load, operation of at least one $CO_2$ compressor with variable speed is proposed. To operate the at least one $CO_2$ compressor with variable speed it is driven either by the generator or the steam turbine or both with a speed controller. To allow variable speed operation of the generator, the generator can for example be configured as a generator with matrix converter or any other type of frequency converter to allow grid connection independent of the operating speed. A suitable combination of generator with matrix converter, also called "electrical machine with a matrix converter" is for example known from U.S. Pat. No. 7,781,925, which is incorporated by reference.

One embodiment of the invention refers to a method to start-up and part load operation as well as shut down of a power plant with $CO_2$ compression. Once $CO_2$ is captured from a power unit, the $CO_2$ compressor can be started and operated with the help of the generator as long as no or insufficient steam to drive the steam turbine is available. The steam turbine is disconnected from the generator with the help of the overrunning clutch. The steam turbine is started once a sufficient amount of steam is available during loading. When the steam turbine reaches operating speed, the clutch engages. With increasing power of the steam turbine, the power of the SFC controlled generator is reduced. Once the steam turbine power is sufficient to drive the compressor, the SFC is switched off and the generator can be synchronized to the power grid. Subsequently the power of the steam turbine is further increased, the generator synchronized to the gird and electric power can be feed into the grid. De-loading and Shut down is done in reverse order. Once the steam turbine power becomes to small to drive the $CO_2$ compressor, a direct shut down of the $CO_2$ compressor is also conceivable.

Besides the method, a power plant comprising a power unit, $CO_2$ capture system and a $CO_2$ compressor designed to enable the method is subject of the invention. To enable the described method the $CO_2$ compressor is arranged on one shaft with a generator and steam turbine, which is engageably connected to a generator via an overrunning clutch. The generator itself is coupled to the $CO_2$ compressor. The generator is connectable to a power grid to deliver power to the grid, when operated as a generator, and can be operated as a motor.

To further enhance the flexibility of the power plant the generators can be configured as a generator with matrix converter to allow grid connection of the generator and variable operating speed of the $CO_2$ compressor.

In another embodiment, a mechanical gear is arranged between the generator and the generator in order to drive a $CO_2$ compressor, which operates, at a high speed. Thus even with the generator and/or the steam turbine running at a grid frequency, for example 50 Hz or 60 Hz, the $CO_2$ compressor can run at a higher speed. Typically a gear will have a transmission ratio of more than 1.5. For example a $CO_2$ compressor with a speed of 100 Hz can be driven by a generator or steam turbine, which is operating at 50 Hz, via a gear.

In an alternative embodiment the $CO_2$ compressor, generator and steam turbine operate at a speed, which is different from the grid frequency. Depending on the size and design of the $CO_2$ compressor the speed or frequency will typically be higher than the grid frequency. To allow operation at higher speed the generator, which drives the $CO_2$ compressor, is a generator with matrix converter or a combination of generator and a frequency converter. Further, the steam turbine is designed to operate at the elevated speed of the $CO_2$ compressor.

In one embodiment the power unit is a CC (combined cycle power plant) comprising a gas turbine, a HRSG (heat recovery steam generator) and a steam turbine. The HRSG and the CC's steam turbine are typically multi-pressure systems. For example a triple pressure HRSG supplying steam to a high-pressure turbine, a medium pressure turbine and a low-pressure turbine are suitable for this application.

For plant optimization of a CC plant the SFC, which is connectible to the gas turbine generator for the start up of the gas turbine is also connectible to the generator, which is arranged on the shaft of the $CO_2$ compressor and dimensioned and designed to continuously drive the $CO_2$ compressor.

In a further embodiment of a power plant comprising a CC, part of the exhaust gases of the CC's gas turbine are recirculated into the inlet air of the gas turbine to increase the $CO_2$ concentration in the exhaust gases, thus facilitating an effective $CO_2$ removal.

In one embodiment the power plant comprises a plurality of power units and a plurality of $CO_2$ compressors. The $CO_2$ captured from the flue gases of the power units is collected in at least one $CO_2$ manifold including piping and then conveyed and fed to the $CO_2$ compressors.

In one embodiment at least one generator out of a plurality of generators is configured as a generator with a matrix converter and at least one generator is directly connected to the grid and operated at grid frequency. The generator with matrix converter allows effective part load operation of the $CO_2$ compressor, which is connected to this generator by variable speed operation. $CO_2$ mass flow variations are mainly handled by the at least one generator, which is operating at variable speed. Large changes in $CO_2$ mass flow are handled by switching on or off of $CO_2$ compressor(s).

DETAILED DESCRIPTION

A power plant for execution of the proposed method comprises a power unit 1, which includes a $CO_2$ capture system, a $CO_2$ compressor 7, a generator, 8 an overrunning clutch 9 and a steam turbine 10.

A typical arrangement is shown in FIG. 1. The power unit 1 is supplied with fuel 2 and ambient air 3. The power unit 1 comprises a conventional fossil fuel fired power plant with at least one water-steam cycle. It can for example be a combined cycle power plant, a conventional coal fired steam power plant or an IGCC. The power unit comprises a $CO_2$ capture system, which removes $CO_2$ generated during the power generating process. Typically the $CO_2$ is removed from flue gases in a backend capture process but it can also be removed during the power generating process, as is the case in an IGCC.

Besides power, which is delivered to the grid via a main grid connection 36, the power unit produces $CO_2$ depleted flue gases 5, which are released to the atmosphere via a stack and a stream of concentrated $CO_2$ 6. Further, live steam 15 is branched of from the power unit's 1 water steam cycle.

The power plant 20 further comprises a $CO_2$ compressor 7, a generator 8 and a steam turbine 10, which are arranged along one shaft 35. The steam turbine 10 is engagable connected to the generator 8 via an overrunning clutch 9.

A steam turbine control valve 17 controls the flow of the live steam 15, which drives the steam turbine 10. If sufficient steam is available the steam turbine 10 can operate to drive the generator 8 and $CO_2$ compressor 7 via the overrunning clutch 9, which automatically engages, and the shaft 35. The steam turbine 10 can be operated to drive the $CO_2$ compressor 7 alone, in combination with the generator 8 or to drive the $CO_2$ compressor and generator 8.

If the steam turbine 10 only drives the $CO_2$ compressor, the generator 8 is rotating idle, preferably without excitation.

If the steam turbine 10 drives the $CO_2$ compressor in combination with the generator 8, the generator is operated as a motor with the help of an SFC 11. In the example shown the generator 8 is connected to an SFC 11 via an electric SFC connection 12. The SFC 11 itself is connected to the electric grid by a SFC grid connection 13.

If the steam turbine 10 drives the $CO_2$ compressor and the generator 8, the generator 8 delivers power to the grid via the grid connection 14.

If no or insufficient steam is available to drive the steam turbine 10 the overrunning clutch is not engaged and the steam turbine is at standstill or idling at reduced speed. In this case the generator 8 drives the $CO_2$ compressor. The generator 8 is again operated as a motor with the help of an SFC 11. In the example shown the generator 8 is connected to an SFC 11 via an electric SFC connection 12. The SFC 11 itself is connected to the electric grid by a SFC grid connection 13.

The electric connections are shown schematically without electric switches, control lines, etc. as these are not subject of the invention. For the same reason the controllers and measurement sensors are not shown.

Figure 2:
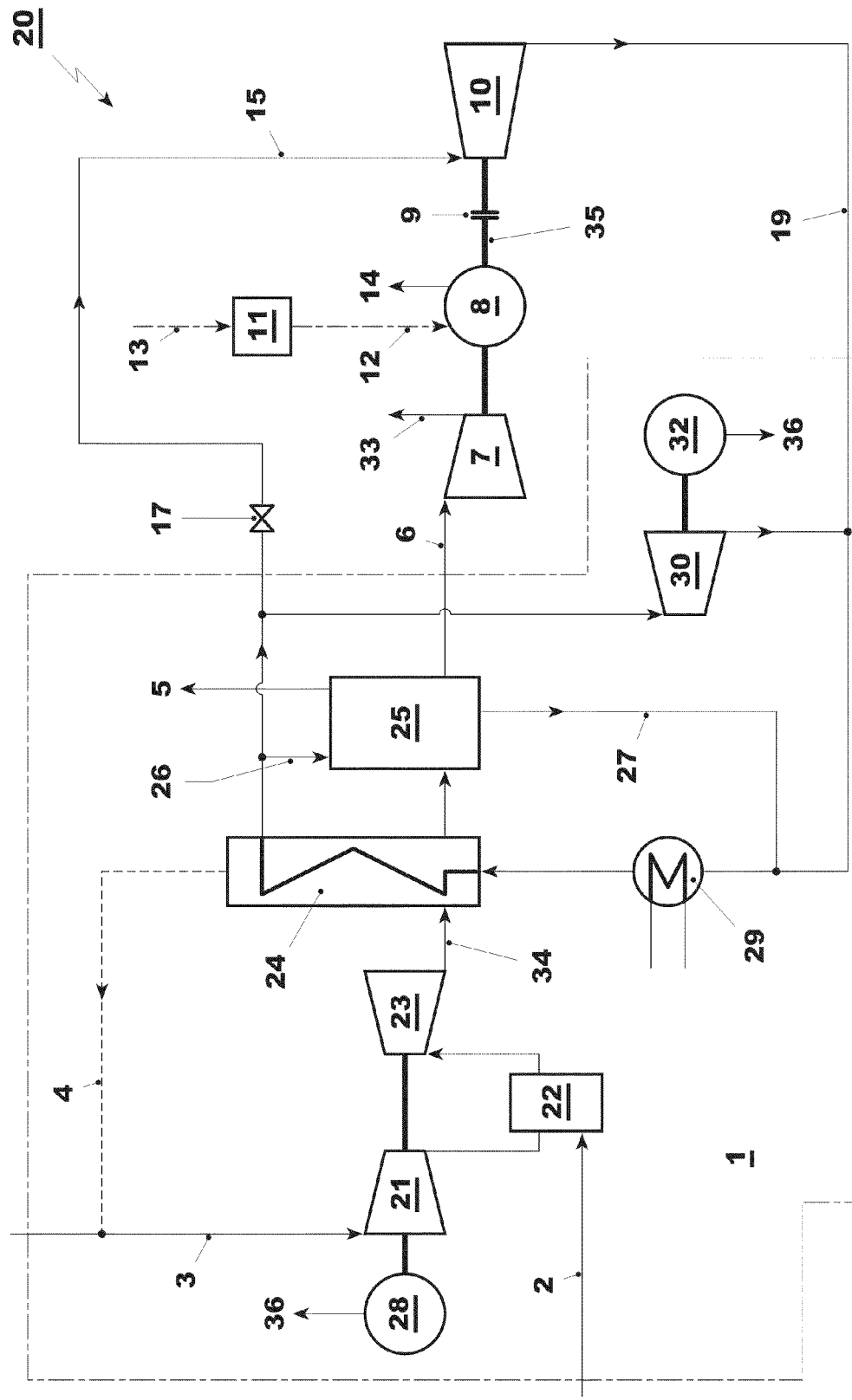

FIG. 2 schematically shows an example with a combined cycle power plant as power unit 1. The CC comprises a gas turbine, a HRSG 24, and a $CO_2$ capture system 25.

The gas turbine comprises at least one compressor 21, at least one combustion chamber 22 and at least one turbine 23. Typically a generator is connected to the gas turbine at the cold end, e.g. the compressor end of the gas turbine.

During normal operation the inlet gas is compressed in a compressor 21. The compressed gas is used for combustion of the fuel 2 in a combustor 22, and the pressurized hot gases expand in a turbine 23. Its main outputs are electric power to the grid, and hot flue gases 34.

The steam cycle is simplified and shown schematically without different steam pressure levels, feed water pumps, etc., as these are not subject of the invention.

The gas turbine's hot flue gases 34 pass through a HRSG 24, which generates live steam 15 for a steam turbine 30. The steam turbine 30 either is arranged in a single shaft configuration with the gas turbine and a gas turbine (GT) generator 28, or as shown in FIG. 2 is arranged in a multi shaft configuration to drive a steam turbine (ST) generator 30. Further, steam is extracted and fed via a steam line 26 to the $CO_2$ capture system 25. The steam is returned to the steam cycle at reduced pressure and temperature or as a condensate via the return line 19 and is reintroduced into the steam cycle. The steam cycle is simplified and shown schematically without different steam pressure levels, feed water pumps, etc., as these are not subject of the invention. Typically low-grade steam is used for the $CO_2$ capture system 25. This steam is for example extracted from a steam turbine 30.

To improve the efficiency of the $CO_2$ capture system 25 a partial flow of the flue gases from the HRSG 24 is branched of for flue gas recirculation. This flue gas recirculation flow 4 is recirculated to the inlet of the compressor 21 of the gas turbine where it is mixed with ambient air 3. The flue gas recirculation flow 4 is typically cooled in a recirculation flue gas cooler (not shown) before mixing with the ambient air 3.

The remaining flue gases of the flue gases from the HRSG 24 are directed to the $CO_2$ capture system 25. Typically the flow split of the flue gases can be controlled by a damper. To enhance the flue gas flow and to control the recirculation rate a flue gas blower or a variable speed flue gas blower to $CO_2$ capture system maybe installed. Further, a flue gas blower or a variable speed flue gas blower for recirculation may be installed. This blower is typically installed downstream of the recirculation flue gas cooler before mixing the recirculation flow 4 of the flue gases with the ambient air 3.

$CO_2$ depleted flue gas 5 is released from the $CO_2$ capture system 25 to the environment via a stack. Typically a flue gas bypass (not shown) is foreseen, to bypass $CO_2$ capture system 25 if it is not operating. Concentrated $CO_2$ 6 is directed to the $CO_2$ compressor 7.

During normal operation the captured $CO_2$ 6 will be compressed by the $CO_2$ compressor 7, and the compressed $CO_2$ will be forwarded for storage or further treatment.

Figure 3:
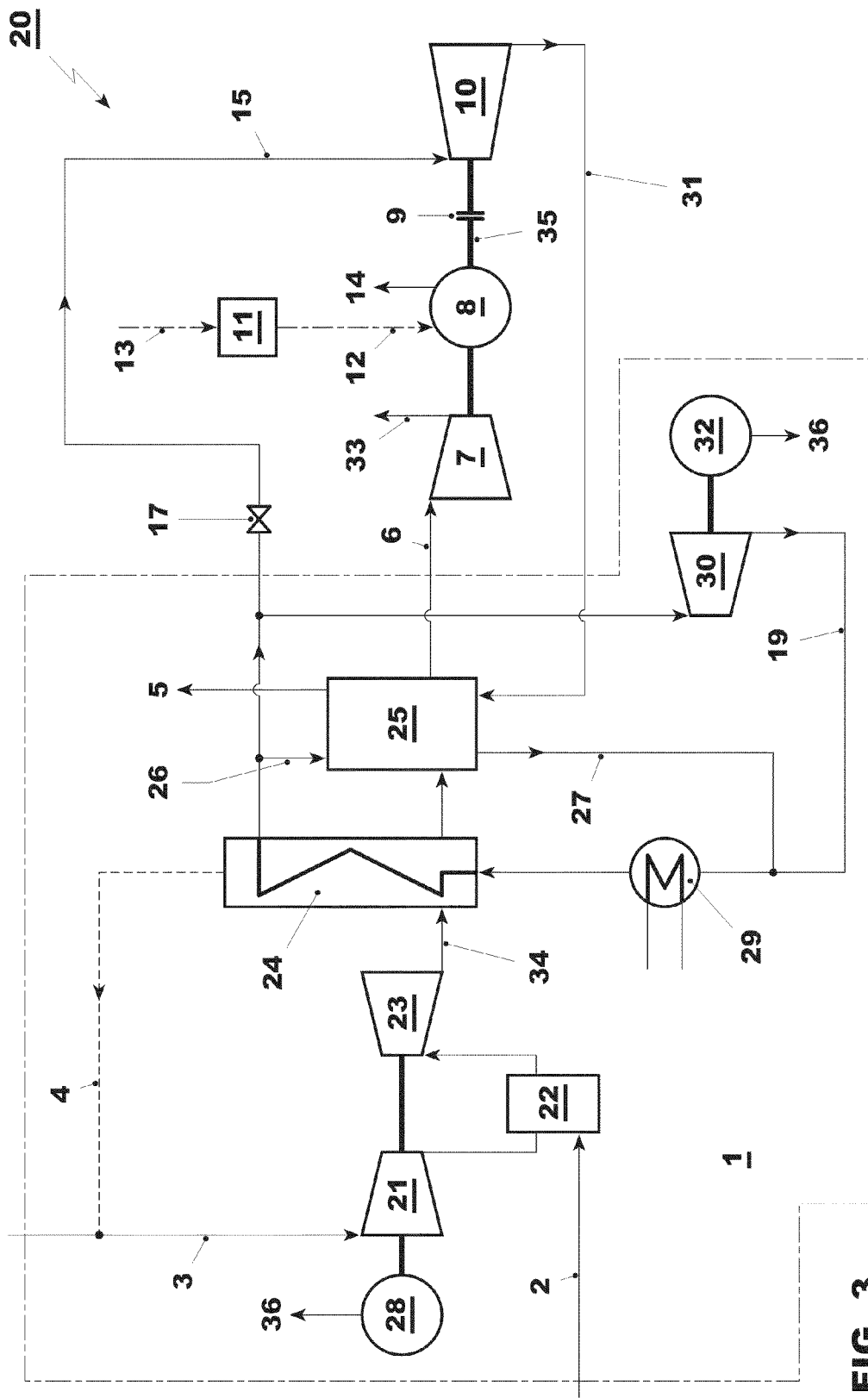

FIG. 3 schematically shows a modification of the plant shown in FIG. 2. In this example the steam turbine 10 is configured as a back pressure steam turbine. The low pressure steam 31 leaving the steam turbine 10 is fed to the $CO_2$ capture system 25. Depending on the size, operating conditions and $CO_2$ capture system 25; the low-pressure steam 31 may be sufficient for the $CO_2$ capture system. In the example of FIG. 3 an additional steam supply line from the HRSG to the $CO_2$ capture system 25 is shown to increase the operable flexibility.

Typically large power plants comprise not only one power unit but a plurality of power units. In particular combined cycle power plants often comprise a plurality of gas turbines, which are either arranged as single shaft power trains with a gas turbine and steam turbine on one shaft, and a HRSG designated for each gas turbine or are arranged as so called multi-shaft arrangements with steam and gas turbines on separate shafts. For multi shaft arrangement the steam generated from several gas turbines' HRSGs is often used to drive one steam turbine.

Figure 4:
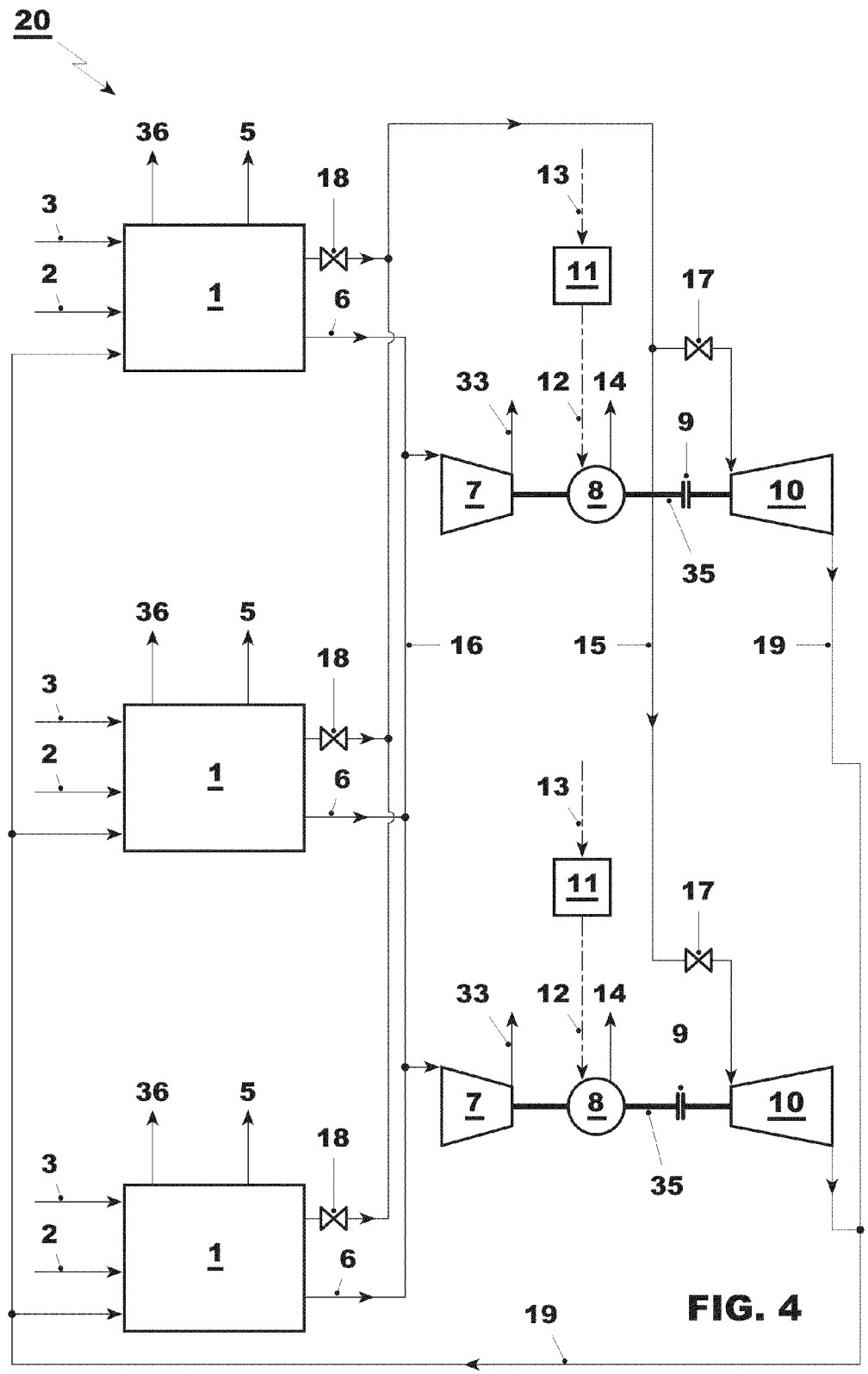

FIG. 4 schematically shows a power plant with three power units 1, which in this example all include a designated including $CO_2$ capture system, two $CO_2$ compressors 7, each arranged on one shaft with a generator 8 and a steam turbine 10 to drive the $CO_2$ compressor 7. The concentrated $CO_2$ 6 is collected from the three power units 1 by a $CO_2$ manifold 16, and flows through this manifold and piping to the two $CO_2$ compressors 7. Depending on the mass flow of concentrated $CO_2$ 6 captured by the $CO_2$ capture system only one or both $CO_2$ compressors 7 are in operation. Depending on the availability of life steam 15, which is delivered from the three power units 1 via a steam manifold to the two steam turbines 10, one or both steam turbines 10 are driving the respective $CO_2$ compressors 7 or the $CO_2$ compressors 7 are only driven by the generators 8 or a combination of both. A steam control valve 18 controls the life steam 15 flow from each power unit 1. The steam supplied to the individual steam turbine 10 is controlled by a steam turbine control valve 17. The steam leaving the steam turbines 10 is collected and returned to the power units 1 via a low-grade steam/condensate return line 19.

Figure 5:
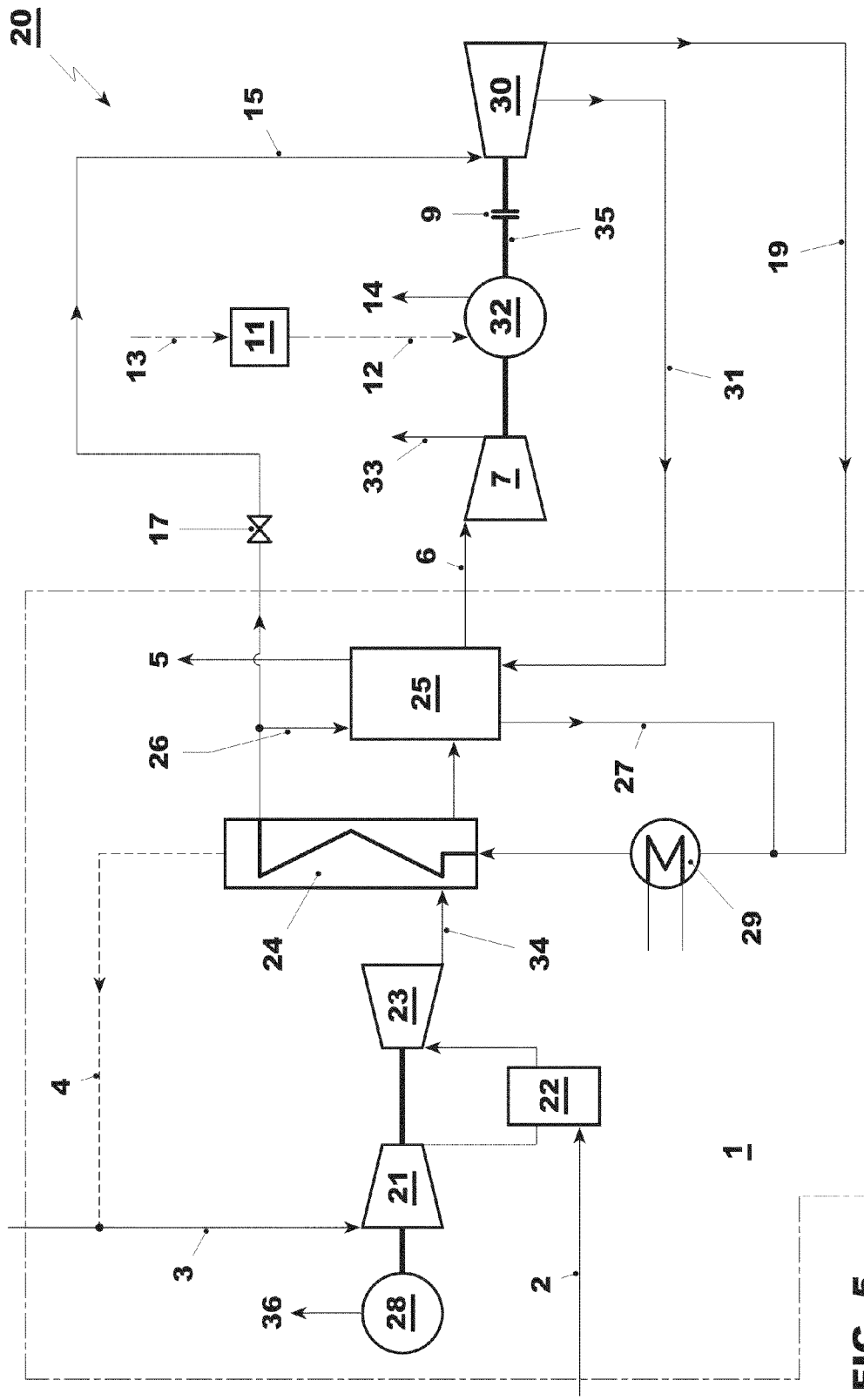

FIG. 5 schematically shows a combined cycle power plant with a $CO_2$ capture system and an integrated $CO_2$ compression system, which is further integrated into the combined cycle plant. In this case the steam turbine 30 of the CC's steam part is used to drive the generator 8 via the overrunning clutch 9. In this arrangement no additional steam turbine 10 is required to drive the generator 8 and the $CO_2$ compressor 7, thus reducing additional costs for $CO_2$ capture. However, if the $CO_2$ compressor is operated with variable speed, the large steam turbine 30 has to be operated with this speed.

In the example shown in FIG. 5 low pressure steam 31 is extracted from the steam turbine 30 to feed the $CO_2$ capture system. Typically the steam turbine 30 is an arrangement of two or three steam turbines operating at different pressure levels, e.g. high, medium and low-pressure steam. As alternative to steam extraction from one of the steam turbines, the low-pressure steam 31 can taken from the exit of the medium pressure steam turbine.

Exemplary embodiments described above and in the drawings disclose to a person skilled in the art embodiments, which differ from the exemplary embodiments and which are contained in the scope of the invention.

For example it might be advantageous in a CC with 4 GTs to use only three $CO_2$ compressors. One of them is operated with variable speed, for example via a generator with matrix converter and the other two are operated at constant speed. For very small $CO_2$ mass flows only the variable speed $CO_2$ compressor is operating. Once the $CO_2$ mass flow exceeds the capacity of the first $CO_2$ compressor, a second compressor is started and operated at design speed. The variable speed compressor is used again for control of flow variations until the third $CO_2$ compressor needs to come into operation. Finally, with two $CO_2$ compressors running at design speed, the variable speed $CO_2$ compressor is operated at corresponding to the $CO_2$ flow requirements.

The final selection will be determined by the CAPEX and performance trade-off, considering the size limitation of the $CO_2$ compressor, additional cost and efficiency impact of the number of $CO_2$ compressors and speed controlled generators, e.g. generators with matrix converters. Further, in all examples, where the use of a SFC together with a generator is described, this combination (SFC plus generator) can be replaced by a generator combined with a matrix converter.

List of reference symbols
1 Power generating unit
2 Fuel supply
3 Ambient air
4 Flue gas recirculation flow (optional)
5 $CO_2$ depleted flue gas
6 Concentrated $CO_2$
7 $CO_2$ compressor
8 Generator
9 Overrunning clutch
10 Steam turbine
11 SFC
12 Electric connection from SFC to drive generator
13 SFC grid connection
14 Electric connection from generator to grid
15 Live steam
16 $CO_2$ manifold
17 Steam turbine control valve
18 Steam control valve
19 Low grade steam/condensate return manifold
20 Power plant
21 GT compressor
22 GT combustion chamber
23 GT turbine
24 HRSG (heat recovery steam generator)
25 $CO_2$ capture system
26 Steam line to $CO_2$ capture system
27 Steam line to steam turbine 30
28 GT generator
29 Condenser
30 Steam turbine
31 Low pressure steam
32 ST generator
33 Compressed $CO_2$
34 GT flue gases
35 Shaft 36 Main grid connection
GT Gas turbine
ST Steam turbine
CC Combined cycle power plant
$CO_2$ Carbon dioxide

What is claimed is:

1. A power plant comprising a power unit with a $CO_2$ capture system and a $CO_2$ compressor arranged downstream of the $CO_2$ capture system, and a steam turbine powered by a live steam line fed by the power unit, the steam turbine engageably connected to a generator and the $CO_2$ compressor via an overrunning clutch, wherein the generator is connectable to a power grid to deliver power to the grid and operable as a motor, and wherein the generator is connected to the $CO_2$ compressor with no interposed coupling.

2. The power plant according to claim 1, wherein a gear is arranged between the $CO_2$ compressor and the generator.

3. The power plant according to claim 1, wherein the generator is a generator with a matrix converter or a combination of generator and a frequency converter to allow grid connection of the generator independent of the operating speed of the $CO_2$ compressor.

4. The power plant according to claim 1, wherein the power unit is a combined cycle power plant comprising a gas turbine, a heat recovery steam generator, a steam turbine and a $CO_2$ capture system.

5. The power plant according to claim 4, wherein a flue gas recirculation flow is recirculated into inlet air of a gas turbine of the combined cycle power plant.

6. The power plant according to claim 1, further comprising a plurality of power generating units and a plurality of $CO_2$ compressors, which are connected by a $CO_2$ manifold.

7. The power plant according to claim 1, wherein the $CO_2$ compressor's design operating speed is different from the grid frequency.

8. A method for operating a power plant comprising a carbon dioxide ($CO_2$) capture system, a generator, a steam turbine powered by a live steam fed by the power plant and a $CO_2$ compressor arranged downstream of the $CO_2$ capture system,
the method comprising:
operating the generator, for $CO_2$ compression, as a motor to drive the $CO_2$ compressor when insufficient steam to drive the steam turbine is available, the generator being mechanically connected to the $CO_2$ compressor with no interposed coupling; and
driving the $CO_2$ compressor, by the steam turbine, via an overrunning clutch, which engages when sufficient steam is available;
wherein during normal steady state high part load and/or base load operation of the plant, the steam turbine is engaged via the overrunning clutch to the generator and the $CO_2$ compressor, and the $CO_2$ compressor is driven by the steam turbine.

9. The method for operating a power plant according to claim 8, wherein the steam turbine, which is driving the $CO_2$ compressor, also drives the generator at the same time as the $CO_2$ compressor and electric power is fed into the grid when the power of the turbine exceeds the power required to drive the $CO_2$ compressor.

10. The method for operating a power plant according to claim 8, wherein during low part load operation and/or loading of the power unit or when no steam is available due to phased construction or an outage of the steam part of a combined cycle power plant, the steam turbine is not engaged via the overrunning clutch and the $CO_2$ compressor is driven by the generator, which is operated as motor during this operating mode.

11. The method for operating a power plant according to claim 8, wherein the steam turbine is engaged with the generator and $CO_2$ compressor via the overrunning clutch, the generator is operated as a motor, and both the steam turbine and the generator drive the $CO_2$ compressor when steam is available but the power output of the steam turbine is less than the power required to drive the $CO_2$ compressor.

12. The method for operating a power plant according to claim 8, wherein $CO_2$ captured from a plurality of power units is collected by a $CO_2$ manifold, and is compressed by a plurality of $CO_2$ compressors.

13. The method for operating a power plant according to claim 12, wherein for part load operation the load reduction of the power plant is realized by deloading the power units to different load levels and deloading the $CO_2$ compressors to equally distribute the $CO_2$ mass flows over all operating $CO_2$ compressors.

14. The method for operating a power plant according to claim 8, wherein at least one $CO_2$ compressor is driven either by the generator and/or the steam turbine and the speed of the $CO_2$ compressor is variably adjusted to control the $CO_2$ flow and/or that at least one generator is configured as a generator with a matrix converter to allow grid connection independent of the operating speed or connected to the grid via a frequency converter.

* * * * *